United States Patent
Oskarsson et al.

Patent Number: 5,334,459
Date of Patent: Aug. 2, 1994

[54] COMPOUND BODY

[75] Inventors: Rolf G. Oskarsson, Ronninge; Mats O. Lundstrom, Sandviken, both of Sweden

[73] Assignee: Sandvik AB, Sandviken, Sweden

[21] Appl. No.: 77,680

[22] Filed: Jun. 16, 1993

[30] Foreign Application Priority Data

Jul. 6, 1992 [SE] Sweden .................. 9202092-4

[51] Int. Cl.⁵ .................................................. B22F 5/00
[52] U.S. Cl. ................................. 428/546; 428/548; 428/551; 428/552; 407/32; 407/53
[58] Field of Search ............. 428/546, 548, 551, 552; 407/32, 53; 75/238

[56] References Cited

U.S. PATENT DOCUMENTS

| | | | |
|---|---|---|---|
| 3,882,579 | 5/1975 | Peacock | 29/95 R |
| 3,918,928 | 11/1975 | Kiyonaga et al. | 29/196.1 |
| 4,050,840 | 9/1977 | Skingle | 408/144 |
| 4,145,213 | 3/1979 | Oskarsson et al. | 75/238 |
| 4,450,205 | 5/1984 | Itaba et al. | 428/552 |
| 4,618,540 | 10/1986 | von Holst et al. | 428/552 |
| 4,698,205 | 10/1987 | Oskarsson et al. | 419/5 |
| 4,781,989 | 11/1988 | Yoshimura et al. | 428/552 |
| 5,181,953 | 1/1993 | Nakano et al. | 75/237 |
| 5,283,030 | 2/1994 | Nakano et al. | 419/53 |

FOREIGN PATENT DOCUMENTS

| | | |
|---|---|---|
| 250072 | 9/1987 | Fed. Rep. of Germany . |
| 2469979 | 5/1981 | France . |
| 8807900 | 10/1988 | World Int. Prop. O. . |

OTHER PUBLICATIONS

D. H. Bruins et al., "Werkzeuge und Werkzeugmaschinen für die spanende Metallbearbeitung", 1975, Carl Hanser Verlag, pp. 78, 79.

Primary Examiner—Donald P. Walsh
Assistant Examiner—John N. Greaves
Attorney, Agent, or Firm—Burns, Doane, Swecker & Mathis

[57] ABSTRACT

There is now provided a tool for chipforming machining of metals and similar materials comprising a high speed steel core and a cover of more wear resistant material than the core. If the material in the core has a carbon content 0.05–0.25% lower than the conventional carbon content for the high speed steel in question, improved properties can be obtained.

10 Claims, 1 Drawing Sheet

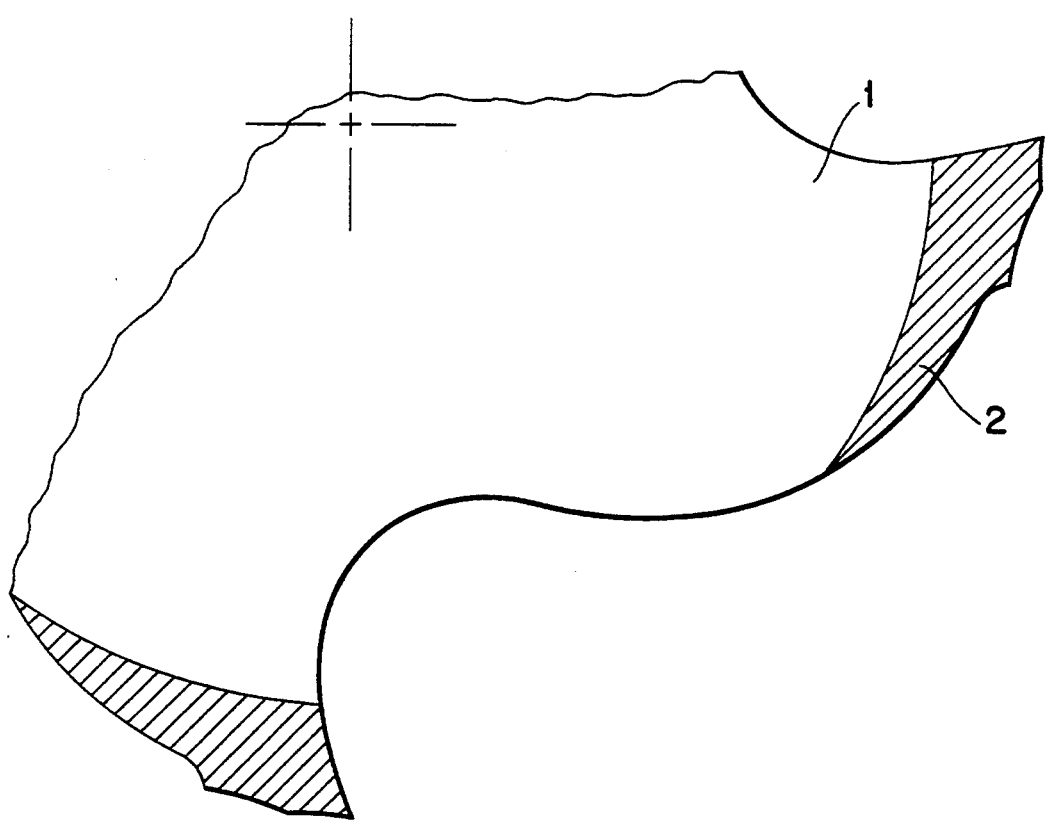

COMPOUND BODY

BACKGROUND OF THE INVENTION

The present invention relates to an improved compound tool with a core of high speed steel and a cover of more wear resistant material.

U.S. Pat. No. 4,618,540, which is hereby incorporated by reference, discloses a compound tool for chip forming machining with superior properties consisting of a core of high speed steel and a surface of a hard material containing 30–70% by volume of particles selected from the group consisting of carbides, nitrides, carbonitrides and mixtures thereof of metals selected from the group consisting of Ti, Zr, Hf, V, Nb, Ta, Cr, Mo, W and mixtures thereof, in a matrix based on Fe, Ni and/or Co. The patent teaches that the high speed steel shall have a conventional composition, e.g., conventional HSS grades M2, M41, T2 and the like with, in particular, a carbon content that from experience and theory has been found to give optimal properties for that particular steel. By conventional composition is thus meant a composition found in international and national standards as well as in specifications from high speed steel manufacturers.

For example, a conventional high speed steel of M2-type has, according to literature data, a nominal composition of the alloying elements 0.3% Si, 0.3% Mn, 4.0% Cr, 5.0% Mo, 6.0% W and 2.0% V with a carbon content of 0.85–0.88 weight-%. To get a higher wear resistance, the carbon content can be increased and consequently about 1.0 weight-% C is a rather common level for M2. A certain variation of the above mentioned figures for the other alloying elements, of course, is allowed. According to the state of the art, the carbon content is considered as the optimum alloying element with regard to a balance in wear resistance and toughness. A decrease in carbon content increases the risk of precipitation of ferrite which gives soft zones in the material. Therefore, the carbon content is not usually considered to be lowered below the nominal amounts. A similar situation in regard to the risk associated with lower carbon content applies to other types of high speed steel.

High speed steel is commercially available in solid or powder state. It should be noted, however, that when a high speed steel powder contains oxygen, the carbon content is increased in order to compensate for the oxygen content. For example, a water granulated M2-powder general has an oxygen content of 0.2 weight-% and a carbon content of 1.1 weight-%. During sintering, carbon monoxide is formed reducing the carbon content in the final product to the convention value as set forth above.

OBJECTS AND SUMMARY OF THE INVENTION

It is an object of this invention to avoid or alleviate the problems of the prior art.

It is further an object of this invention to provide an improved compound tool with a core of high speed steel and a cover of more wear resistant material.

In one aspect of the invention there is provided a tool for chipforming machining of metals and similar materials comprising a tough core of high speed steel and a surface of more wear resistant material than the core, the high speed steel of the core containing carbon in an amount 0.05–0.25% lower than the conventional content of carbon for that particular high speed steel.

BRIEF DESCRIPTION OF THE DRAWINGS

The FIGURE shows a shank end mill, partial cross section.

DETAILED DESCRIPTION OF THE PREFERRED EMBODIMENTS OF THE INVENTION

It has now surprisingly turned out that the interplay between the core and cover in a compound body as disclosed in U.S. Pat. No. 4,618,540, such as adhesion, reduced tendency to cracking due to insufficient compatibility, etc., is considerably improved without any loss of cutting properties of the resulting tools if the carbon content in the high speed steel core is 0.01–0.25%, preferably 0.1–0.2%, by weight lower than what is established for the core material in question with unchanged content of alloying elements and without any loss of cutting properties of the resulting body. The toughness behavior (transverse rupture strength) is increased and no chipping occurs in the chisel edges of the tool.

According to the present invention, there is now provided a compound tool for chipforming machining of metals and similar materials comprising a high speed steel core and a cover of more wear resistant material than the core. The material in the core has a carbon content 0.05–0.25 % lower than the conventional amount of carbon for that material.

Preferably, the wear resistant cover comprises a hard material from 30 to 70 volume % of particles selected from the group consisting of carbides, nitrides, carbonitrides and mixtures thereof of metals selected from the group consisting of Ti, Zr, Hf, V, Nb, Ta, Cr, Mo, W and mixtures thereof in a matrix based on Fe, Co and/or Ni as set forth in U.S. Pat. No. 4,618,540 or, alternatively, a high speed steel with high carbon ($>1\%$ by weight) and high cobalt ($\geq 5\%$ by weight) content. The thickness of the cover shall be at least 0.5 min.

In a preferred embodiment, the core has a nominal composition of alloying elements of 0.3% Si, 0.3% Mn, 4.0% Cr, 5.0% Mo, 6.0% W and 2.0% V with a carbon content of 0.6–0.8 weight-% which, other than the reduced carbon content (nominally 0.85–0.88%) is grade M2.

In another preferred embodiment, the core has a nominal composition of alloying elements of 0.3% Si, 0.3% Mn, 4.0% Cr, 5.0% Mo, 6.0–6.5% W and 3.0% V with a carbon content of 1.0–1.2 weight-% which, other than the reduced carbon content (nominally 1.25–1.30%) is grade M3:2.

In yet another preferred embodiment, the core has a nominal composition of alloying elements of 0.3% Si, 0.3% Mn, 4.0% Cr, 3.1% Mo, 9.0% W, 9.0% Co and 3.1% V with a carbon content 1.00–1.20 weight-% which, other than the reduced carbon content (nominally 1.25–1.30%) is grade T42.

In still another preferred embodiment, the core has a nominal composition of alloying elements of 0.3% Si, 0.3% Mn, 6.75% W, 4.0% Mo, 4.25% Cr, 2.0% V and 5.0% Co with a carbon content 0.85–1.05 weight-% which, other than the reduced carbon content (nominally 1.10–1.15%) is grade M41.

Tools according to the present invention are suitably used as drilling end mills with a diameter of preferably $\geq 10$ mm and preferably with a hardness of the core of 650–850 HB, most preferably 680–820 HB. As shown in the Figure which is a partial cutaway view of a shank end mill, one of the types of products obtainable with the present invention, the wear-resistant material 2 forms the cutting edges while the core material 1 comprises the major part of the tool material.

Tools according to the invention are preferably coated with a thin wear-resistant layer of preferably TiN and/or TiCN by PVD-technique in accordance with know procedures.

The invention is additionally illustrated in connection with the following Examples which are to be considered as illustrative of the present invention. It should be understood, however, that the invention is not limited to the specific details of the Examples.

EXAMPLE 1

A high speed steel of nominal M2-type with a carbon content of 0.64 instead of the conventional 0.84, both % by weight, and normally present amounts of other alloying elements, e.g., P, S, Al, etc., was manufactured by induction melting. After customary heat treatment and plastic working to 45 mm diameter rods, cores were made with 40 mm diameter which via CIP-(cold isostatic pressing)-technique were enclosed in a cover with an external diameter of 69 mm diameter of a powder material containing about 50% submicron titanium nitride according to U.S. Pat. No. 4,618,540. The compound bodies were placed in extrusion cans diameter$_\gamma$=76 mm and wall thickness of 3 mm which were evacuated and sealed.

After heating to 1175° C. for 1 h rods, 14.6 mm diameter were extruded. These rods were annealed at 900° C., and blanks for end mills 12 mm diameter were manufactured by cutting, centerless grinding and dowel hole drilling. The blanks were heat treated in vacuum at 1190° C. for 15 min., cooled in N$_2$ at 5 atm overpressure and annealed 3×1 h at 575° C. As a result, a hardness of 700–730 HV10 was obtained for the core and 1030–1060 HV10 for the cover. From these heat treated blanks, two flute drilling end mills 12 mm diameter were made. The finished end mills were coated with 2 μm TiN with PVD technique and tested according to the following:

| | |
|---|---|
| Cutting speed | 70 m/min |
| Cutting depth axially | 12 mm |
| Cutting depth radially | 3 mm |
| Feed | 245 mm/min |
| Tooth feed | 0.065 mm/rev |
| Sidemilling | (run as down milling) |
| With cooling | (emulsion) |
| Work piece material | SS 1672 (about 200 HB) |
| Milled length | 12 m (49 min) |
| Result: | |
| Flank wear | |
| main edge | 0.08 mm |
| chisel edge | 0.20 mm |

This is a very good result. No damage or wear of the high speed steel part of the chisel edges is observed.

As a comparison high speed steel end mills, even coated ones, would not be expected to survive the above-mentioned cutting data.

EXAMPLE 2

In order to test the drilling ability of end mills according to the invention under extreme conditions, a test was made with milling of 35 mm long V-grooves with 5 mm depth where each individual groove was started with a drilling operation. The test was performed with two flute end mills 12 mm diameter of the same type as in Example 1 except that they were coated with an about 2 μm thick coating of PVD-TiCN.

Three different core materials were used:

| | |
|---|---|
| Conventional M2 with 0.84% C | 830 HV Hardness |
| M2 with 0.74% C | 755 HV Hardness |
| M2 with 0.64% C | 690 HV Hardness |

The surface material was the same in all three cases, i.e., about 50% by volume submicron titanium nitride in an iron based matrix from the same powder charge with hardness 1050HV.

Two separate tests with different work piece materials were made with the following cutting data and results:

| Work piece material | SS2244-380 HB | SS2541-300 HB |
|---|---|---|
| Cutting speed, m/min | 40 | 60 |
| Drill feed, mm/min | 30 | 60 |
| Table feed, mm/min | 150 | 250 |
| C-content for best variant | 0.64 | 0.64 |
| Best tool life, grooves | about 175 | about 360 |

The core material was not tool life-determining in any of the tests. The toughness measured as transverse rupture strength on non-ground end mill blanks, i.e., round bars, also increases.

Example 3

A high speed steel compound bar was produced via powder metallurgical technique with a cover of nominal M42-composition, i.e., 1.1% C, 0.3% Si, 0.3% Mn, 4% Cr, 9.5% Mo, 1.5% W, 1.2% V and 8% Co and a core of nominal M2-composition but with lower carbon content than the conventional M2: 0.65% C, 0.3% Si, 0.3% Mn, 4.0% Cr, 5.0% Mo, 6.0% W and 2.0% V. Powder of the surface material was produced by inert gas granulation whereas the core was produced from solid bar. A compound bar was extruded after heating the compound blank (produced with technique according to Example 1) to 1100° C. From this compound bar end mills 10 mm diameter were produced which showed considerably better toughness behavior without any loss in cutting performance compared to end mills from solid M42also produced with powder metallurgical technique heat treated and ground at the same time as the end mills according to the invention.

In this case there is a decrease in raw material cost since the expensive cobalt can be saved to a large extent.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A tool for chipforming machining of metals and similar materials comprising a tough core of high speed steel and a surface of more wear resistant material than the core, the high speed steel of the core containing carbon in an amount 0.05–0.25% lower than the conventional content of carbon for that particular high speed steel, said high-speed steels being HSS grades including of M2, M3:2, M41, M42, T2 and T42.

2. The tool of claim 1 wherein the wear resistant surface comprises a high speed steel.

3. The tool of claim 1 wherein the wear resistant surface comprises a hard material from 30 to 70 volume % of particles selected from the group consisting of carbides, nitrides, carbonitrides and mixtures thereof of metals selected from the group consisting of Ti, Zr, Hf, V, Nb, Ta, Cr, Mo, W and mixtures thereof in a matrix based on Fe, Co and/or Ni.

4. The tool of claim 1 wherein the core has a hardness of 650–850 HB.

5. The tool of claim 1 wherein the core has the nominal composition of alloying elements 0.3% Si, 0.3% Mn, 4.0% Cr, 5.0% Mo, 6.0% W and 2.0% V with a carbon content of 0.6–0.8 weight-%.

6. The tool of claim 1 wherein the core has the nominal composition of alloying elements 0.3% Si, 0.3% Mn, 4.0% Cr, 5.0% Mo, 6.0–6.5 % W and 3.0% V with a carbon content of 1.0–1.2 weight-%.

7. The tool of claim 1 wherein the core has the nominal composition of alloying elements 0.3% Si, 0.3% Mn, 4.0% Cr, 3.1% Mo, 9.0% W, 9.0% C and 3.1% V with a carbon content of 1.00–1.20 weight-%.

8. The tool of claim 1 wherein the core has the nominal composition of alloying elements 0.3% Si, 0.3% Mn, 6.75 % W, 4.0% Mo, 4.25% Cr, 2.0% V and 5.0% Co with a carbon content of 0.9–1.1 weight-%.

9. The tool of claim 1 wherein said tool is an end mill

10. The tool of claim 1 wherein at least the surface portion of said tool is coated with a thin wear resistant layer.

* * * * *